United States Patent [19]
Bowyer et al.

[11] Patent Number: 5,804,953
[45] Date of Patent: Sep. 8, 1998

[54] POWER CONVERTER FOR CONVERTING AC SHORE POWER TO SHIPBOARD USE

[75] Inventors: Richard N. Bowyer, Pasadena; John S. Dale, Canyon; Geoffrey West, Irvine, all of Calif.

[73] Assignee: Atlas Energy Systems, Inc., South El Monte, Calif.

[21] Appl. No.: 511,016

[22] Filed: Aug. 3, 1995

[51] Int. Cl.⁶ .............................. G05F 1/147; G05F 1/16; H02J 1/00; H02M 1/12

[52] U.S. Cl. .......................... 323/256; 323/341; 323/258; 363/48

[58] Field of Search .................................... 323/301, 255, 323/256, 257, 258, 340, 341, 342; 363/48, 43

[56] References Cited

U.S. PATENT DOCUMENTS

| | | | |
|---|---|---|---|
| 4,044,285 | 8/1977 | Plunkett et al. | 318/227 |
| 4,323,838 | 4/1982 | Pettigrew | 323/256 |
| 4,389,606 | 6/1983 | Detering | 318/712 |
| 4,591,831 | 5/1986 | D'Anci | 323/257 |
| 4,763,059 | 8/1988 | Espelage et al. | 363/39 |
| 4,843,296 | 6/1989 | Tanaka | 363/37 |
| 4,896,092 | 1/1990 | Flynn | 323/258 |
| 5,053,635 | 10/1991 | West | 307/67 |
| 5,081,368 | 1/1992 | West | 307/67 |
| 5,373,436 | 12/1994 | Yamaguchi et al. | 363/98 |
| 5,450,002 | 9/1995 | Dunk | 323/257 |

Primary Examiner—Peter S. Wong
Assistant Examiner—Bao Q. Vu
Attorney, Agent, or Firm—Vorys, Sater, Seymour and Pease

[57] ABSTRACT

A power converter for converting shore power voltage, phase, and frequency for shipboard use includes a variable inductance input transformer that can be connected to the shore power. The primary windings of the transformer have a plurality of taps, and a respective computer-controlled switch is connected between adjacent taps to selectively establish a closed circuit or an open circuit between the taps and thereby configure the primary windings as a low or high voltage "delta" or "wye", as appropriate for the shore power voltage. The output of the input transformer is sent to a variable speed drive, then to an output transformer, and thence to the distribution bus of the ship. A voltage regulator regulates the output voltage of the output transformer. If desired, a phase selector can be provided between the shore power and input transformer to establish the phase characteristics (i.e., single, two-, or three-phase) of the power signal that is output by the input transformer, depending upon the phase characteristics of the shore power that is connected to the input transformer.

17 Claims, 9 Drawing Sheets

FIG. 1
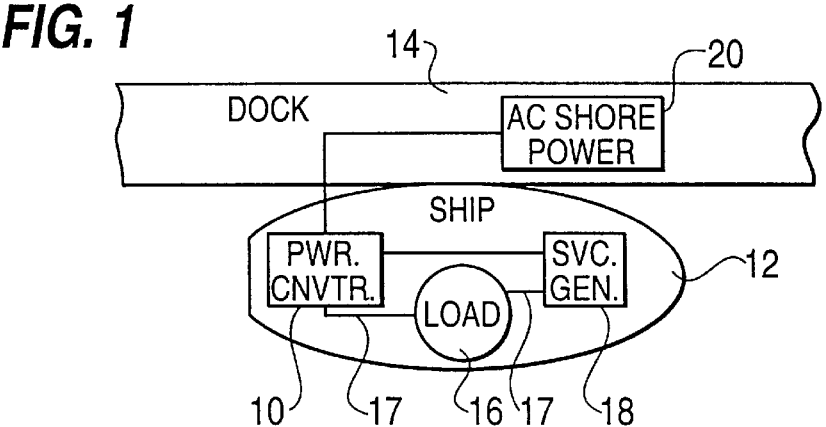
FIG. 3
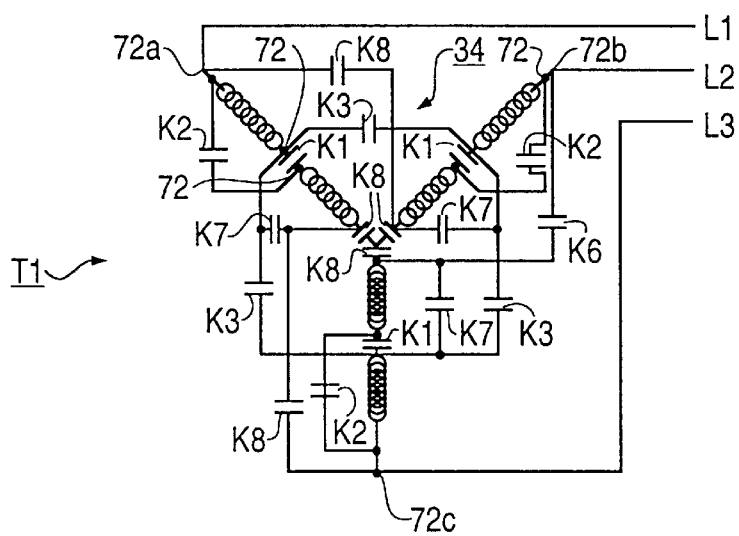
FIG. 4
| A/D CNVTR. COUNTS (x10) | AC SHORE PWR. VOLT. | CONTACTS ENERGIZED | T1 PRI. CONFIG. |
|---|---|---|---|
| 425-725 | 100-170 VAC | K2, K6, K7 | LOW DELTA |
| 726-1065 | 171-250 VAC | K2, K3, K8 | LOW WYE |
| 1066-1448 | 251-340 VAC | K1, K6 | HIGH DELTA |
| 1449-2100 | 341-510 VAC | K1, K8 | HIGH WYE |

| VOLTAGE CONTROL TRIACS CLOSED | MICRO PROCESSOR LOGIC | SHORE POWER AC VOLTS | CONTACTS ENERGIZED | T1 PRIMARY CONFIGURATION |
|---|---|---|---|---|
| 1. | ON | 180/215VAC | K1. K2. K3 | LOW PARALLEL DELTA |
| 2. | ON | 215/300VAC | K2. K6. K7 | HIGH PARALLEL DELTA |
| 3. | ON | 300/435VAC | K1. K8 | LOW SERIES DELTA |
| 4. | ON | 435/520VAC | K7. K9 | HIGH SERIES DELTA |

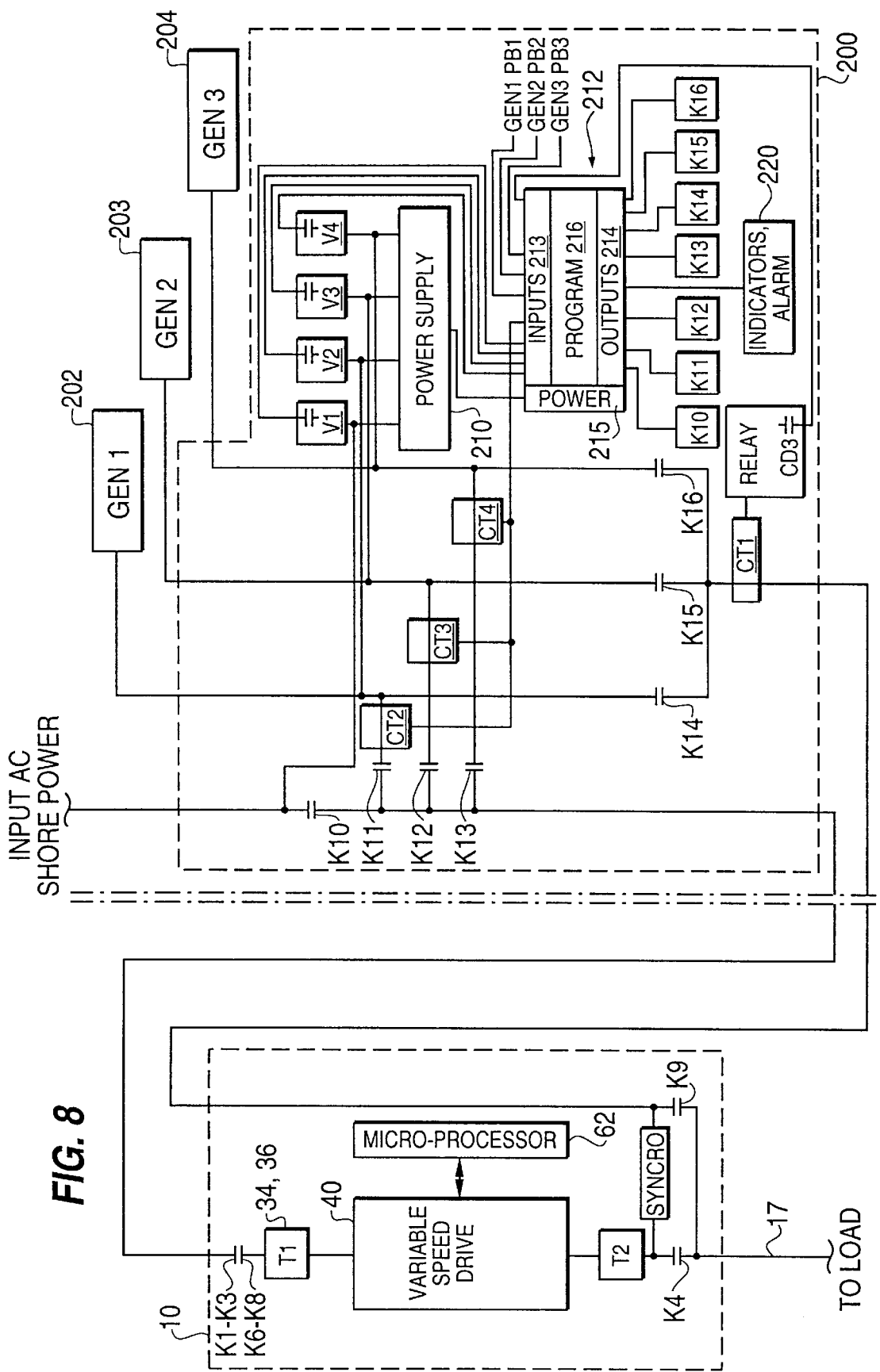

POWER CONVERTER FOR CONVERTING AC SHORE POWER TO SHIPBOARD USE

BACKGROUND OF THE INVENTION

1. Field of the Invention

The present invention relates generally to shipboard electrical systems, and more particularly to apparatus and methods for converting electrical alternating current (AC) shore power for shipboard use.

2. Description of the Related Art

Most modern military and commercial ships have a plethora of electrical equipment requiring alternating current (AC) power for operation. The AC power is generally supplied via at least one main power distribution bus which is electrically connected to one or more sources of AC power. When a ship is at sea, the source of AC power is a shipboard service generator that is coupled to a prime mover, such as a diesel engine, a steam or gas turbine, or even a large direct current battery (through a motor-generator DC-AC converter).

It happens that a shipboard service generator typically outputs AC power having substantially fixed voltage, frequency, and phase characteristics. Consequently, the ship's AC power distribution system is designed with a particular main distribution bus voltage, frequency, and phase in mind. In other words, to properly operate the various electrical components of a ship, AC power having predetermined voltage, frequency, and phase characteristics must be provided.

While AC power is supplied at sea by the ship's service generator, in port it is desirable to connect the main distribution bus to a dockside source of AC shore power to permit electrically disconnecting the service generator from the bus and then deactivating the service generator. In this way, prime mover fuel is conserved and maintenance on the service generator system can be performed, without interrupting power to various shipboard electrical components.

Unfortunately, it happens that before connecting the ship's main distribution to AC shore power, the ship's main distribution must be disconnected from the ship's generator AC output causing a power interruption to the shipboard electrical components. Furthermore, it happens that the electrical characteristics of shore power sources can vary widely from port to port and for this reason, it is sometimes necessary to convert power having first characteristics of voltage, frequency and phase, to ship service power having second characteristics of voltage, frequency and phase, to permit energizing shipboard electrical components with the shore power.

As recognized by the present invention, however, standard electrical power transformation devices can be limited in the input electrical characteristics they are able to convert. Stated differently, a standard transformer device may be capable of converting shore power only in some ports to shipboard use, but not be sufficiently operationally flexible to convert shore power voltage, frequency and phase in other ports to shipboard use, because of potentially widely varying shore power characteristics from port to port. Consequently, in ports that supply shore power with voltage, frequency and phase characteristics that are outside the capability of a ship's transformer device to convert, it is necessary for the ship to continue to operate its service generator to power shipboard electrical components during its entire stay in port.

Accordingly, the present invention recognizes that it would be advantageous to provide a power converter which can convert shore power to shipboard use and also transfer the ship's main power distribution bus to the AC shore power without interrupting power to various shipboard electrical components. It is, therefore, an object of the present invention to provide a power converter for converting shore power to shipboard use and to transfer the ship's load from one power path to another without interrupting power to various shipboard electrical components and which can be used in most ports around the world. Another objective of the present invention is to provide a power converter for converting shore power to shipboard use which can convert input power having first characteristics of voltage, frequency and phase, to output power having second characteristics of voltage, frequency and phase. A further objective of the present invention is to provide a power converter for transferring the shipboard electrical components from one shipboard generator to second or third shipboard generator without interrupting power to various shipboard electrical components. Still another object o the present invention is to provide a power converter for converting shore power to shipboard use which is easy to use and cost effective.

SUMMARY OF THE INVENTION

An apparatus is disclosed for interconnecting a source of AC shore power characterized by a shore voltage to an AC distribution bus on a ship requiring an operating voltage. The apparatus includes an input transformer which itself includes primary windings that have a plurality of taps. As intended by the present invention, the input transformer is connectable to the source of AC shore power, and is also connectable in electrical communication with the AC distribution bus. A plurality of switches is provided, and each switch is connected to provide a closed circuit or an open circuit between two respective taps of plurality of taps. Further, a control unit configures the plurality of switches to establish a configuration of the primary windings in response to at least the shore voltage.

In another aspect of the present invention, an AC power converter has a converter input for receiving a first input AC power signal. The power converter also includes a variable inductance input transformer with selectively configurable primary windings connected to the converter input, and output windings. Moreover, the converter includes a variable speed motor drive which has an input connected to the output windings of the input transformer and an output. An output transformer is connected to the output of the variable speed motor drive, and an AC power output terminal is connected to the output transformer for providing a first AC output power signal. Further, an input AC power sensor is connected to the converter input, and a control unit is connected to the input AC power sensor and to the primary windings of the input transformer to selectively configure the primary windings in response to an AC power signal on the converter input.

Preferably, an AC output power sensor is connected to the AC power output terminal. Moreover, control means are provided in the control unit and are coupled to the AC output power sensor and to the variable speed motor drive for regulating the voltage of the first AC output power signal.

Additionally, in the preferred embodiment a switch is selectively movable between a first position, wherein the first AC output power signal is connected to an AC load, a second position, wherein a second AC output power signal is connected to the AC load, and a third position, wherein both AC output power signals are connected to the AC load.

An AC phase synchronizer is connected to the AC output power signals and to the control unit for generating a synch signal representative of the phase difference between the AC power output signals. In accordance with the further disclosure below, means are provided in the control unit for establishing the position of the switch in response to the synch signal, the establishing means moving the switch to the third position only when substantially no phase difference exists between the AC power output signals.

As envisioned by the presently preferred embodiment, the means in the controller is further for moving the switch from the third position to the second or first position upon passage of a predetermined delay from setting the switch to the first state. Desirably, a harmonic filter is connected to the AC power output terminal. In this preferred embodiment, the output transformer includes input windings connected to the output of the variable speed drive and output windings connected to the AC power output terminal.

The input transformer is a variable tap transformer with a plurality of taps in the primary windings. Accordingly, the control unit includes a plurality of switches, each switch being connected to provide a closed circuit or an open circuit between two respective taps of plurality of taps. Also, processor means are provided for causing the plurality of switches to configure the primary windings in a delta and a wye circuit. More specifically, the processor means causes the plurality of switches to configure the primary windings in a high voltage delta configuration, a low voltage delta configuration, a high voltage wye configuration, and a low voltage wye configuration.

Alternately, the input transfer may be a variable top transformer with an input winding designed as a series delta/parallel delta configuration. In this case, the processor means control the plurality of switches to configure the primary windings in a high voltage series delta configuration, a low voltage series delta configuration, a high voltage parallel delta configuration, and a low voltage delta configuration.

In some embodiments of the power converter of the present invention, a phase selector is electrically connected between the first AC input power signal and the converter input. The phase selector has an "A" input for receiving AC power having one or two phases, a "B" input for receiving AC power having one or two phases, and a three phase input for receiving AC power having three phases. Computer-based means are provided for causing the phase selector to connect the three-phase input to the converter input without connecting the "A" and "B" inputs to the converter input when three phase AC power is present at the three phase input before AC power is present at the "A" and "B" inputs.

Additionally, computer-based means cause the phase selector to connect the "A" input to the converter input without connecting the "B" input to the converter input when one or two phase AC power is present at both inputs, unless the voltage AC power at the "A" input equals the voltage of the AC power at the "B" input. Moreover, computer-based means cause the phase selector to connect the "A" input to the converter input and the "B" input to the converter input when two phase AC power is present at both inputs and one phase at the "A" input is different from the two phases at the "B" input, such that the converter input receives three phase power.

In yet another aspect of the present invention, a method is disclosed for connecting a source of AC power characterized by a supply voltage to an electrical component requiring AC power characterized by an operating voltage different from the supply voltage. The method includes the steps of providing a variable inductance input transformer with primary windings selectively configurable by means of a plurality of switches associated with the primary windings. As intended herein, the input transformer also has output windings. The method then envisions connecting the primary windings of the input transformer to the source of AC shore power. Next, the method includes operating at least some of the switches to selectively establish a delta or wye configuration, or a series delta or parallel delta configuration, of the primary windings in response to at least the supply voltage. Then, electrical communication is established between the output windings of the input transformer and the electrical component.

BRIEF DESCRIPTION OF THE DRAWINGS

The details of the present invention, both as to its structure and operation, can best be understood in reference to the accompanying drawings, in which like reference numerals refer to like parts, and in which:

FIG. 1 is a schematic of a dockside ship incorporating the power converter of the present invention;

FIGS. 3 and 3A show alternate electrical schematics of the selectively configurable primary windings of the input transformer of the power converter;

FIGS. 4 and 4A are tables showing the logic of the present invention in configuring the primary windings of the input transformer of the power converter according to FIGS. 3A and 3B, respectively;

FIG. 8 is a block diagram of a generator no-break configuration using the power converter of the invention.

DETAILED DESCRIPTION OF THE PREFERRED EMBODIMENTS

Figure 2:
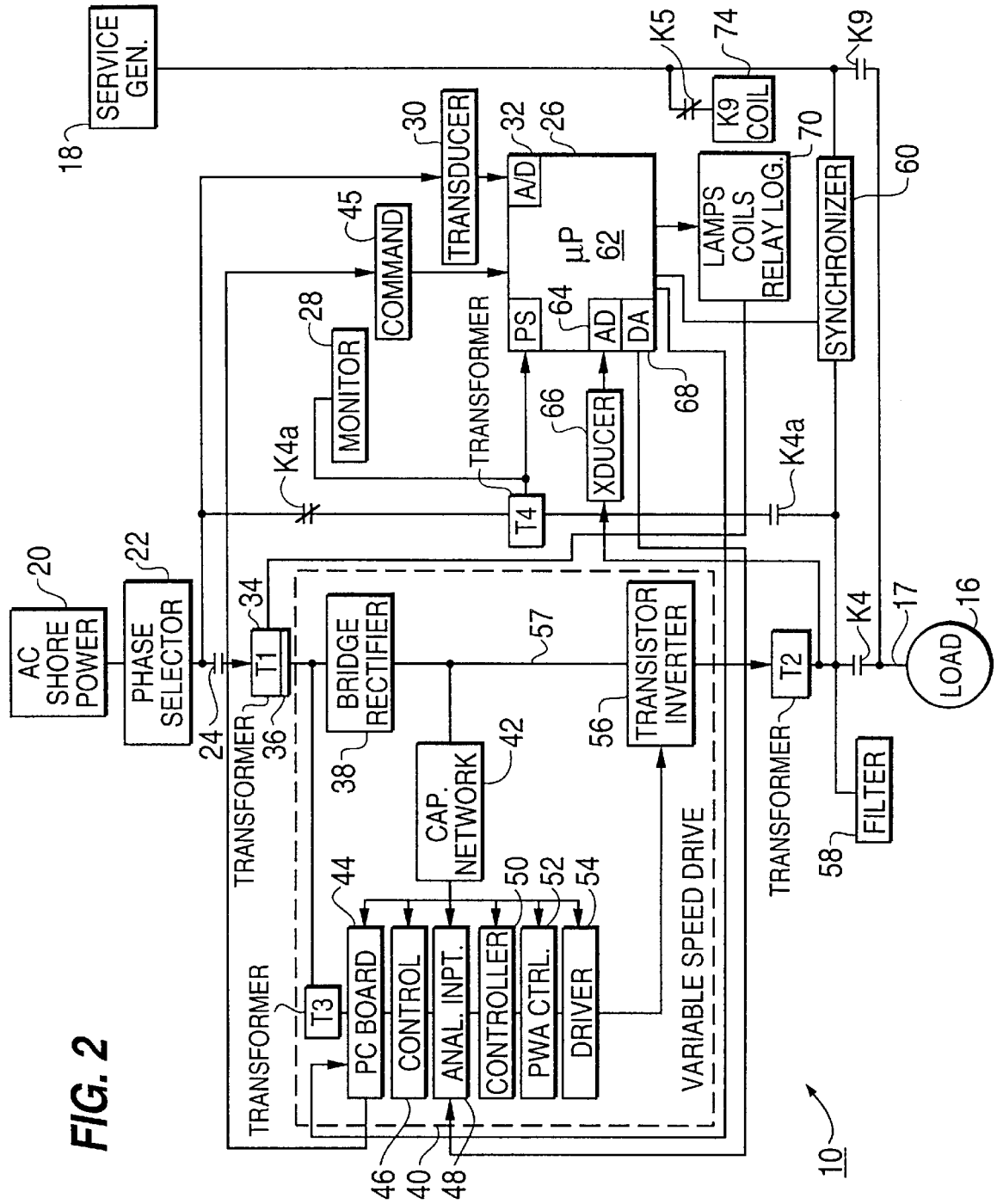
FIG. 2 is a block diagram of the power converter of the present invention.

Referring initially to FIG. 1, a power converter 10 is shown located on a ship 12 that is moored to a dock 14. As shown, the ship 12 includes at least one AC electrical component or load 16 that is connected to a shipboard main AC distribution bus 17 which can be energized by a shipboard service generator 18. Alternatively, the bus 17 can be energized, through the power converter 10, by an AC shore power source 20 located on the dock 14. It is to be understood that in a dockside physical embodiment, the AC shore power source 20 can be one or more electrical cables that are connected to an onshore power distribution grid.

In understanding the Figures, all contacts are shown in their "normal" positions, i.e., each contact is shown in the position it assumes when its associated operating coil is deenergized. Furthermore, contacts which are operated together by a single relay or by ganged relays are referred to by a single reference notation. Thus, for example, FIG. 2 shows two normally open contacts which are commonly designated "K4", indicating that these contacts always open and close together.

Now referring to FIG. 2, if desired the power converter 10 can include a phase selector 22, described in further detail below with reference to FIGS. 6 and 7, the input of which is connected to the AC shore power source 20 and the output of which is connected to a plurality of contacts, represented in FIG. 2 as a single contact 24. It is to be understood that the output of the phase selector 22 is essentially the shore power AC power signal which is input to the contacts 24, and that the input side of the contacts 24 accordingly establishes a power converter input.

As shown in FIG. 2, the shore power AC power signal is also sent via a contact K4 to a computer power transducer T4, which in turn is connected to a power supply PS of a control unit 26 to provide power to the control unit 26. Additionally, a signal monitor 28 is connected to the computer power transducer T4 to monitor and display by analog or digital means the electrical characteristics of the output AC power signal present on the distribution bus 17, when the bus 17 is being supplied with shore power-driven electricity from an output transformer T2, described below. Furthermore, the shore power AC power signal is sent to an input AC power sensor transducer 30, which converts the input power signal to a direct current (DC) voltage having a scale of zero volts to ten volts DC (0–10 VDC) and then sends the DC voltage to a first input analog-to-digital (A/D) converter 32 of the control unit 26. The magnitude of this DC voltage is linearly proportional to the input power signal voltage, and is thus representative of the magnitude of the AC shore power voltage.

In turn, the first input A/D converter 32 converts the DC voltage to a number of pulse counts per second. In the preferred embodiment, the number of counts per second is scaled from 0 to 255, and is linearly proportional to the DC voltage from the first input transducer 30. Thus, the control unit 26 and its components can access a signal in counts per second that is representative of the AC shore power voltage.

Figure 2A:
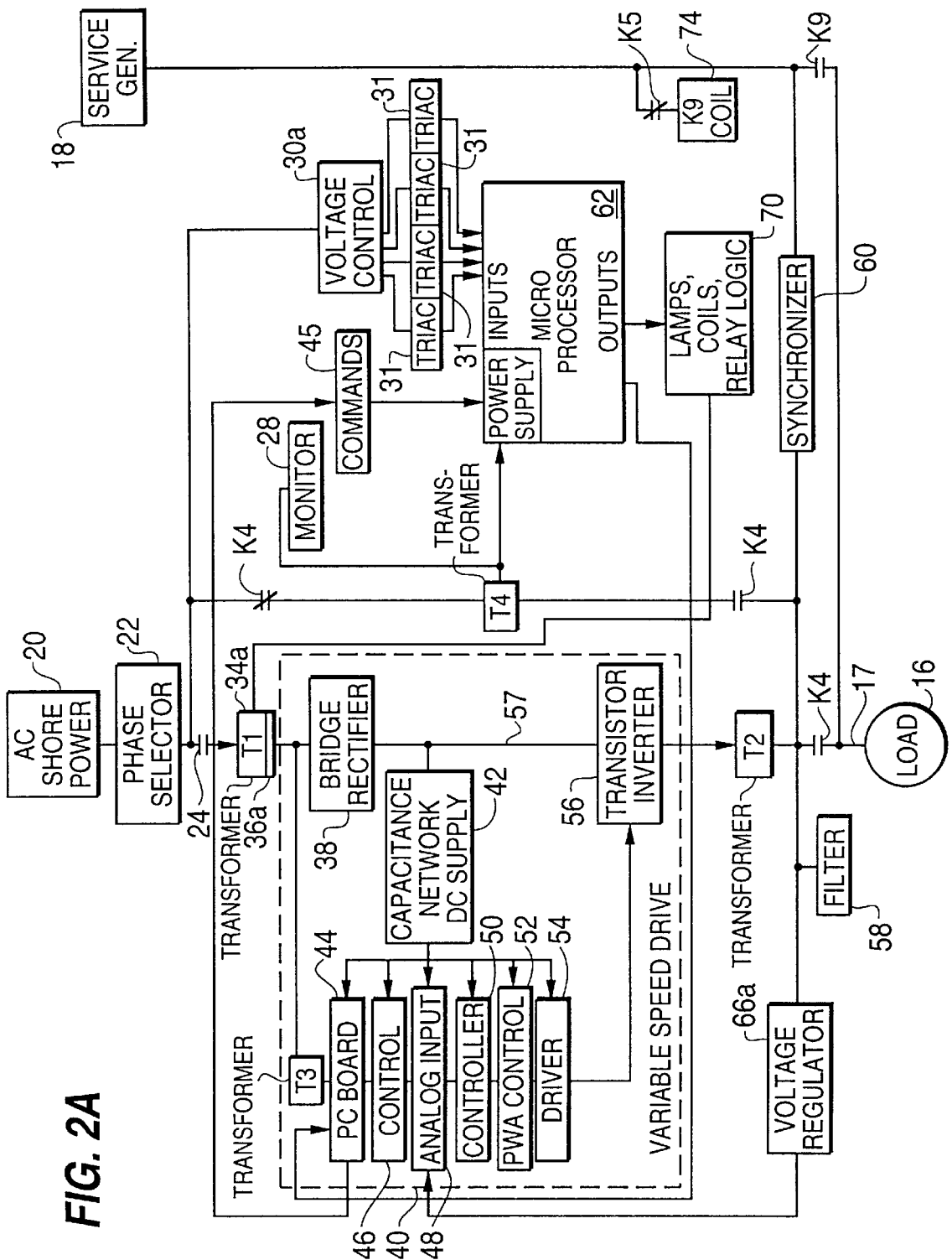
FIG. 2A is a block diagram showing representation of shore power voltage magnitude by a voltage control.

Alternatively, the voltage sensor 30 can be replaced by a voltage control 30a as manufactured by Arga Controls of California which, when connected to the shore power AC power source as shown in FIG. 2A, senses the input AC voltage level and causes one of four transistors (not shown) to switch on depending upon the level of voltage being detected and which corresponds to a preset voltage bandwidth. Furthermore, depending upon the voltage level being detected, the voltage control 30a switches on one of four triacs 31 which in turn signal the micro-processor of the particular voltage level. The analog to digital converter 32 FIG. 2 is not used in this case. The micro-processor program selects the correct switches to close and sends a shore power AC signal to selectively configurable primary windings 34a of the variable inductance input transformer T1. The secondary windings 36a of the input transformer T1a are connected to a bridge rectifier 38 and power transformer T3 of the variable speed motor drive unit 40.

As shown in FIG. 2, the contacts 24, when closed, send a shore power AC power signal to selectively configurable primary windings 34 of a variable inductance input transformer T1. The details of the input transformer T1 are discussed below in reference to FIGS. 3 and 4. As can be appreciated in reference to FIG. 2, secondary windings 36 of the input transformer T1 are connected to a bridge rectifier 38 and power transducer T3 of a variable speed motor drive unit 40.

Preferably, the variable speed drive unit 40 is a type GPD503 device made by Magnetek of New Berlin, Wis. Alternatively, other variable speed drives may be used, e.g., the variable speed drives made by Yaskawa Electric Mfrg. of Tokyo or AAB Electric of Wisconsin.

Those skilled in the art may realize that variable speed drives are primarily intended for use with AC motor drives. However, in this invention, the variable speed drive 40, along with the components and programming described herein is used as a variable voltage and frequency regulator/converter.

In accordance with the preferred embodiment, the variable speed drive includes a capacitance network 42 for receiving the output from the bridge rectifier 38 and for filtering AC signals therefrom. In turn, the capacitance network 42 is connected to several components of the variable speed drive 40 well-known in the art, including a programmable main control PC board 44 for selectively controlling the operation of the variable speed drive 40 in response to parameter values established at the factory or by the user. The main control PC board 44 is connected to the control unit 26 via an operational command module 45, and is energized by the input transformer T3 as shown. Also, the variable speed drive 40 includes a multi-function control module 46, a voltage analog input 48, a voltage-frequency controller 50, a pulse width modulation module 52, and a transistor base driver 54. The above-mentioned components are fully discussed in the GPD503 technical manual, available from Magnetek.

Continuing with the description of FIG. 2, the output of the bridge rectifier 38 and of the transistor base driver 54 are input to a 3 phase power transistor/inverter module 56. In turn, the output of the transistor/inverter module 56, which establishes the output of the variable speed drive 40, is sent to an output transformer T2, and thence via a first power output contact K4 to the ship's service distribution bus 17.

Stated differently, the first power output contact K4 essentially establishes an AC power output terminal that is connected to the output transformer T2 for providing a first AC output power signal to the distribution bus 17. Preferably, a harmonic filter 58 is connected to the output of the output transformer T2 for filtering the third through the thirty first ($3_{rd}$–$31^{st}$) harmonics of the AC output signal from the output transformer T2.

FIG. 2 additionally shows that the shipboard service generator 18 can be electrically connected to the distribution bus 17 via a second power output contact K9. As intended herein, the shipboard service generator 18 generates a second AC power output signal for energizing the distribution bus 17. A phase synchronizer 60 is connected between the first and second AC power output signals upstream of the power output contacts K4, K9 for facilitating energization of the distribution bus 17 by the first and second power output signals in parallel with each other, as described further below. More specifically, the synchronizer 60 is connected to the AC output power signals and to the control unit 26, and the synchronizer 60 generates a synch signal that is representative of the phase difference between the AC power output signals for facilitating connecting the signals in parallel to the distribution bus 17.

Still referring to FIG. 2, the control unit 26 includes a microprocessor 62, which can be any microprocessor suitable for executing the operations discussed below. For example, the microprocessor 62 can be a Pentium® microprocessor, or a so-called 80/486 microprocessor, or some other suitable processor means known to those skilled in the art. Indeed, the microprocessor 62 can be an analog computer that is equivalent to the digital structures disclosed, although digital processing is preferred. Among other operations, the microprocessor 62 controls the contacts of the present invention.

Accordingly, as intended by the present invention the power output contacts K4, K9 cooperate in response to signals from the microprocessor 62 to establish a switch which is selectively movable between three positions. In a first position (i.e., with the first power output contact K4 closed and the second power output contact K9 open), only the first AC output power signal is connected to the distribution bus 17. In a second position (i.e., with the first power output contact K4 open and the second power output contact K9 closed) only the second AC output power signal is connected to the distribution bus 17. And, in a third position (i.e., with both power output contacts K4, K9 closed), both AC output power signals are connected to the distribution bus 17.

In addition, the control unit 26 includes a second input analog-to-digital (A/D) converter 64, and the first AC power output signal (i.e., the output of the output transformer T2) is sent to the second input A/D converter 64 via a conversion transducer 66. The conversion transducer 66 converts the voltage output signal to a direct current (DC) voltage for input to the second input A/D converter 64. Thus, the conversion transducer 66 establishes a voltage sensor for sensing the output voltage of the output transducer T2.

Concluding the description of FIG. 2, the control unit 26 includes a digital-to-analog (D/A) converter 68, and signals from the microprocessor 62 are sent through the D/A converter 68, converted from pulses to a DC voltage, and then sent to the analog input 48 of the variable speed drive 40. Alternatively, a voltage regulator 66a (FIG. 2A) as manufactured by Arga Controls of California can substitute for 64, 66, 68 in FIG. 2. The input to the voltage regulator 66a is connected to the output power from transformer T2. The voltage regulator 66a is connected to the output power from transformer T2. The voltage regulator 66a transforms, rectifies, and compares the AC voltage and outputs a 0 to 10 VDCs signal, which is provided to the analog input 48 of the variable speed drive.

As shown in FIG. 2, the microprocessor 62 controls the operation of various lamps, coils, and contact relay logic disclosed below and represented by block 70. Accordingly, it may now be understood that the microprocessor 62 controls the operation of the contacts of the present invention.

Now referring to FIG. 3, the selectively configurable primary windings 34 of the variable inductance input transformer T1 are shown, along with input transformer contacts K1–K3 and K6–K8. It is to be understood that the input transformer contacts K1–K3 and K6–K8 are represented by the input contact 24 in FIG. 2. As can be appreciated in reference to FIG. 3, the input transformer T1 is a variable tap transformer with a plurality of taps 72 in the primary windings 34, and the shore power AC power signal is input via three input lines L1, L2, L3 to three outer input taps 72a, 72b, 72c of the primary windings 34.

Per the present invention, the input transformer contacts K1–K3 and K6–K8 establish respective switches, with each switch being connected to provide a closed circuit or an open circuit between two respective taps 72, as shown. By appropriately operating the switches, the primary windings can be configured as a high voltage delta configuration, a low voltage delta configuration, a high voltage wye configuration, or a low voltage wye configuration, as appropriate for the magnitude of the shore power AC power signal voltage.

FIG. 4 shows, in tabular form, the logic of the microprocessor 62 in configuring the input transformer contacts. Recall that the microprocessor 62 receives a signal, in the form of pulse counts per second, from the first input A/D converter 32. As shown in FIG. 4, the processor means of the control unit 26, that is, the microprocessor 62, accesses data structure representative of or analogous to FIG. 4 to multiply the output of the first input A/D converter 32 by a factor of ten, as shown in the first column of FIG. 4. The corresponding AC shore power voltage is shown in the second column of FIG. 4. In response to the signal from the first input A/D converter 32, the microprocessor 62 enters the appropriate row of the first column and selects the input transformer contacts to be closed from the third column in the row. The fourth column indicates the resulting configuration of the primary windings 34. Thus, the primary windings 34 of the input transformer T1 are configured as appropriate for the shore power voltage.

Figures 3A, 4A:
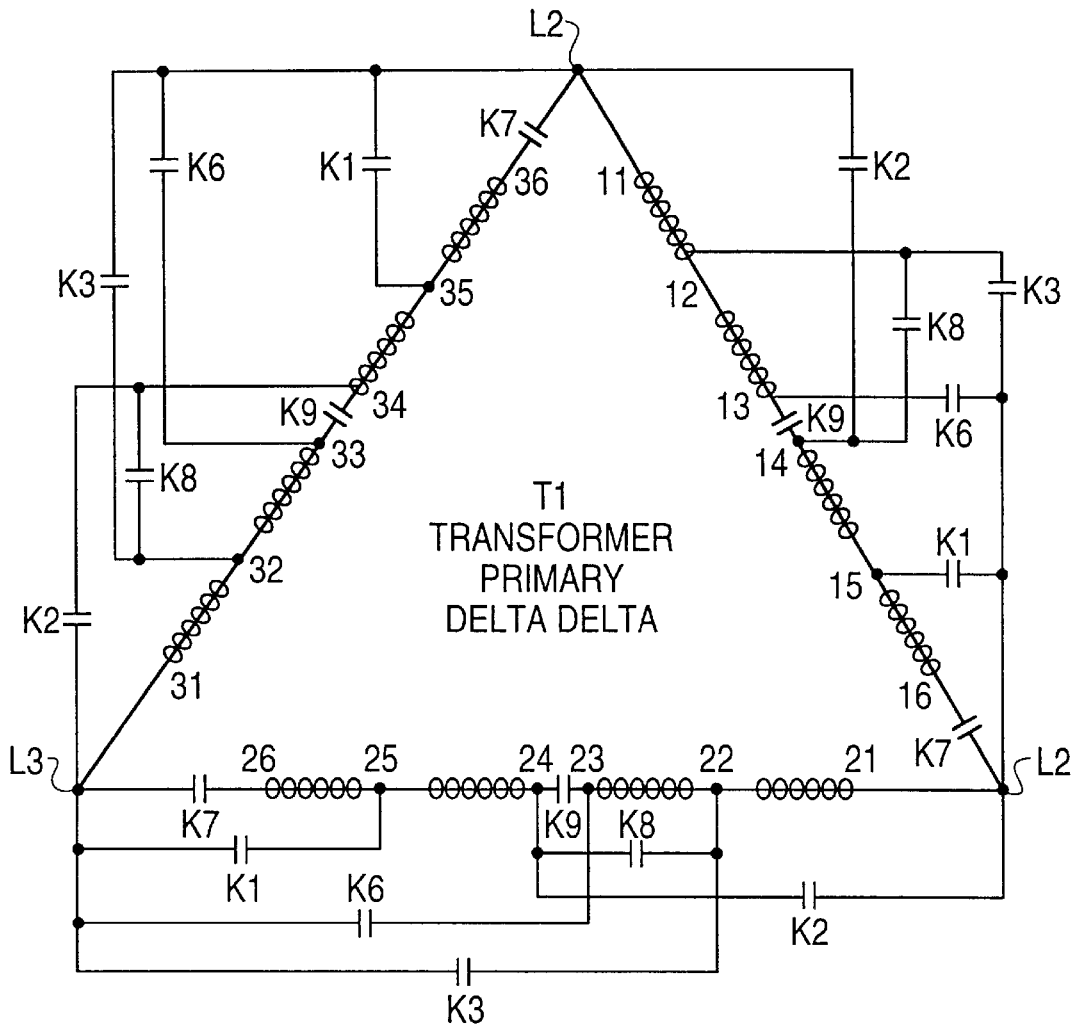

An alternative embodiment employing another input transformer can be understood with reference to FIGS. 2A, 3A, and 4A, where the input transformer T1 comprises a variable tap transformer with an input winding design in a series delta/parallel delta ("delta/delta") configuration which produces a slightly improved voltage level on the input side of the bridge rectifier 38 when connected to a single-phase AC shore power source. As shown in FIG. 4A, the processor means in this case are programmed to cause the plurality of switches to configure the primary windings of the delta/delta transformer into a high voltage series delta configuration, a low voltage series delta configuration, a low voltage series delta configuration, a high voltage parallel delta configuration, and a low voltage parallel delta configuration.

The preferred embodiment of FIGS. 2–4 is preferred for larger ships, which usually dock at ports where three-phase AC shore power is more readily available, in which case the primary side of the input transformer T1 (FIG. 3), being wound in the wye/delta configuration, can produce the required power for the ship's load. Smaller ships sometimes dock at ports where only single-phase AC shore power is available, in which case there is a small power derating factor applied to the power converter. By installing the alternate delta/delta input transformer T1 (FIG. 3A) in the power converter, the derating factor of the power converter is somewhat improved.

Referring to FIG. 2A, with the delta/delta type input transformer T1, the input transformer contacts establish respective switches, with each switch being connected to provide a closed circuit or an open circuit between two respective taps 72, as shown in FIG. 4A. By appropriately operating the switches, the primary windings of the input transformer of the alternate embodiment can be configured as high or low voltage series delta configuration or as a high or low voltage parallel delta configuration, as appropriate for the magnitude of the shore power AC power signal voltage.

Referring again to FIG. 2A, the voltage control 30a replaces the analog-to-digital converter 32 of FIG. 2. The four triacs 31 output a signal to the microprocessor inputs to operate the microprocessor accordingly, and the microprocessor program determines the selection of switches to close to allow a shore power AC power source signal to pass through the selected contactors to the primary windings 34a. Thus, the primary windings 34a of the alternate embodiment input transformer T1 are configured as appropriate for the shore power voltage level.

In light of the above disclosure, the operation of the power converter 10 can be appreciated, with particular reference to FIG. 2. Initially, shore power is unavailable, and a K9 contact coil 74 is energized by the shipboard service generator 18 via a contact K5 to close the second power output contact K9. Consequently, the distribution bus 17 is supplied with three phase AC power from the service generator 18, with the first power output contacts K4 in the open position.

When shore power has been connected to the input of the power converter 10, the shore power AC power signal is sent via the normally closed output contact K4 shown in FIG. 2 to the computer power transducer T4. The transducer T4 converts the high AC shore power voltage to a DC supply voltage and sends the DC supply voltage to the signal monitor 28 and the power supply PS of the control unit 26 to energize these components, including the microprocessor 62.

Also, as disclosed above the microprocessor 62 receives a count signal from the first input A/D converter 32 that is representative of the AC shore power voltage. In response, the microprocessor 62 closes selected of the input transformer contacts K1–K3 and K6–K8 in accordance with the logic embodied in FIG. 4 and discussed above to appropriately configure the primary windings 34 of the input transformer T1 for the magnitude of the shore power voltage. In accordance with previous disclosure, in other words the input contact 24 shown in FIG. 2 is closed.

With the primary windings 34 configured, AC power is inductively transferred to the secondary windings 36 of the input transformer T1. In the presently preferred embodiment, the secondary windings 36 are configured in a so-called "High Wye" configuration to output an AC voltage of about four hundred eighty volts (480 VAC). Those skilled in the art will recognize that the input transformer T1 also functions as an isolation transformer to reduce voltage spikes and prevent harmonics of the AC voltage and current within the power converter 10 from being fed back to the shore power system.

The AC power signal from the input transformer T1 is sent to the full wave bridge rectifier 38 and power transducer T3 of the variable speed drive 40. In the preferred embodiment, the power transducer T3 reduces the voltage to two hundred twenty volts (220 VAC) and sends the reduced voltage to the main PC board 44 and other components within the variable speed drive 40. On the other hand, the full wave bridge rectifier 38 converts the AC power signal from the input transformer T1 to DC and sends its DC output to the transistor inverter 56, capacitance network 42, and all other control boards within the variable speed drive 40.

As those skilled in the art will appreciate, the capacitance network 42 smooths the DC signal from the bridge rectifier 38 prior to sending the DC power signal to the components of the variable speed drive 40 discussed above. In accordance with the operation of the variable speed drive disclosed, the main PC board 44 monitors the operation of the variable speed drive 40. In the event of a fault, the PC board 44 generates a fault signal and sends the fault signal to the microprocessor 62 via the command module 45.

As intended by the present invention, a user of the power converter 10 can input a desired output voltage and frequency by means of the microprocessor 62, and the desired output characteristics are sent via the D/A converter 68 to the analog input 48 of the variable speed drive 40. Alternatively, the desired output voltage and frequency of the power converter 10 can be controlled by means of the voltage regulator 66a (FIG. 2A). In accordance with the principles of operation of variable speed drives, the base driver 54 is caused to input voltage pulses to the transistor inverter 56, which converts the pulses to an AC output power signal having the desired output voltage and frequency characteristics.

As shown in FIG. 2, the output of the transistor inverter 56 is sent to primary windings of the output transformer T2. In turn, secondary windings of the output transformer T2 generate the first AC power output signal and the signal is sent to the harmonic filter 58 for operation as described, and to the synchronizer 60. The microprocessor monitors, i.e., samples, the first AC power output signal via the conversion transducer 66 and the second input A/D converter 64.

At this point in the operation of the power converter 10, the first and second AC power output signals are available to the synchronizer 60. When the voltage, frequency, and phase of the first AC power output signal substantially matches the voltage, frequency, and phase of the second AC power output signal, the synchronizer 60 generates a synch signal and sends the synch signal to the microprocessor 62. Stated differently, the synch signal is generated when substantially no phase difference exists between the AC power output signals.

In response to the synch signal, the microprocessor 62 energizes the relay (represented at block 70) that operates the first power output contacts K4. Thereby, the first AC power output signal is connected to the distribution bus 17 in parallel with the second AC power output signal. Also, the computer power transducer T4 (and, hence, the control unit 26) is no longer supplied with power directly from the AC shore power source 20, but instead receives power from the output transformer T2.

After a predetermined delay, preferably about thirty milliseconds (30 ms), the microprocessor 62 energizes the K5 coil represented at block 70, opening the K5 shown and thus deenergizing the K9 coil 74. As a result, the second power output contacts K9 open, and the service generator 18 is disconnected from the distribution bus 17.

When it is desired to reconnect the service generator 18 to the bus 17, a user manually inputs a signal to the microprocessor 62. Upon receipt of this signal and of the synch signal, the microprocessor 62 deenergizes the K5 coil, thereby energizing the K9 coil 74 and hence closing the second power output contacts K9. After the predetermined delay, the microprocessor 62 deenergizes the K4 coil, causing the first power output contacts to assume the normal positions shown in FIG. 2.

Voltage Control

Figure 5:
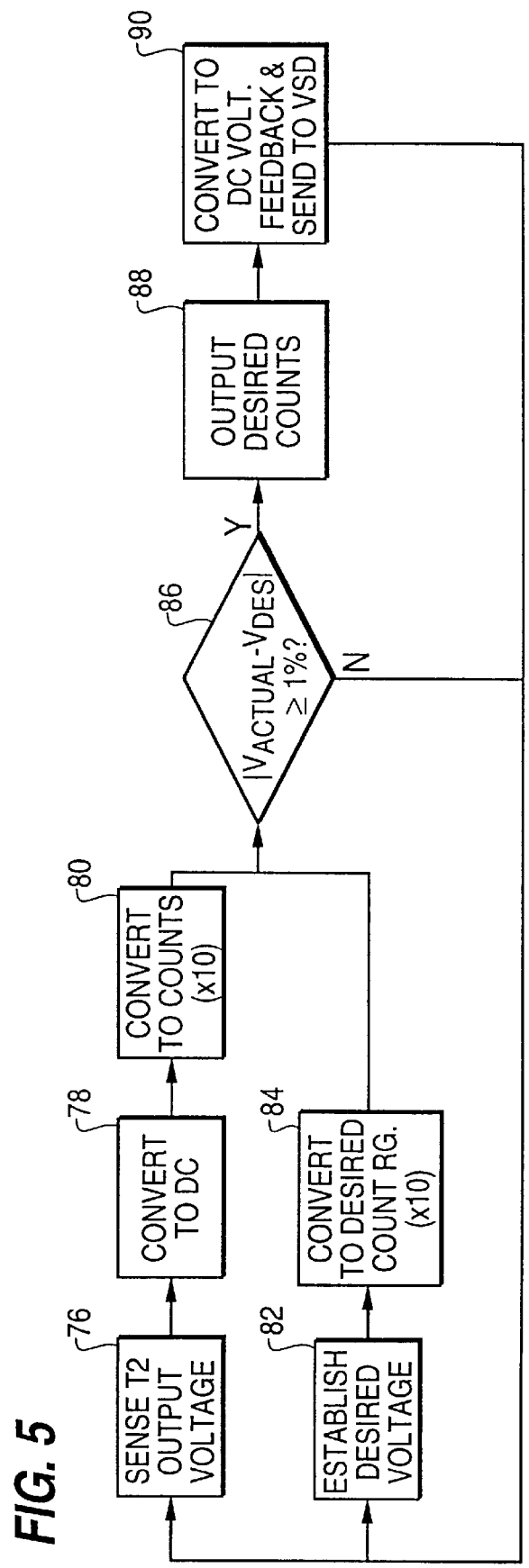
FIG. 5 is a flow chart showing the logic of the power converter in regulating its output voltage.

FIG. 5 shows that the power converter 10 includes provisions for regulating the output voltage of the output transformer T2. Starting at block 76, the conversion transformer 66 senses the output voltage of the output transducer T2, and at block 78 converts the output voltage to DC. At block 80, the second input A/D converter 64 converts the DC signal from the transducer 66 to counts, and the microprocessor 62 multiplies the counts by ten.

At block 82, the user inputs the desired voltage to the microprocessor 62, which converts the desired voltage to counts at block 84, multiplying the desired counts by ten. Next, at decision block 86, the microprocessor 62 determines whether the output voltage of the output transformer T2 is greater than one per cent more or less than the desired voltage. If not, the microprocessor 62 returns to blocks 76 and 82.

On the other hand, if, at decision block 86, the microprocessor 62 determines that the output voltage of the output transformer T2 is greater than one per cent more or less than the desired voltage, it proceeds to block 88. At block 88, the microprocessor 62 outputs a desired count signal. This desired count signal is sent via the D/A converter 68 of the control unit 26 to the analog input 48 of the variable speed drive 40 at block 90. In response, the base driver 54 is caused to alter the signal to the transistor inverter 56 as appropriate to establish the desired output voltage of the output transformer T2. From block 90, the microprocessor 62 returns to blocks 76 and 82.

Figure 5A:
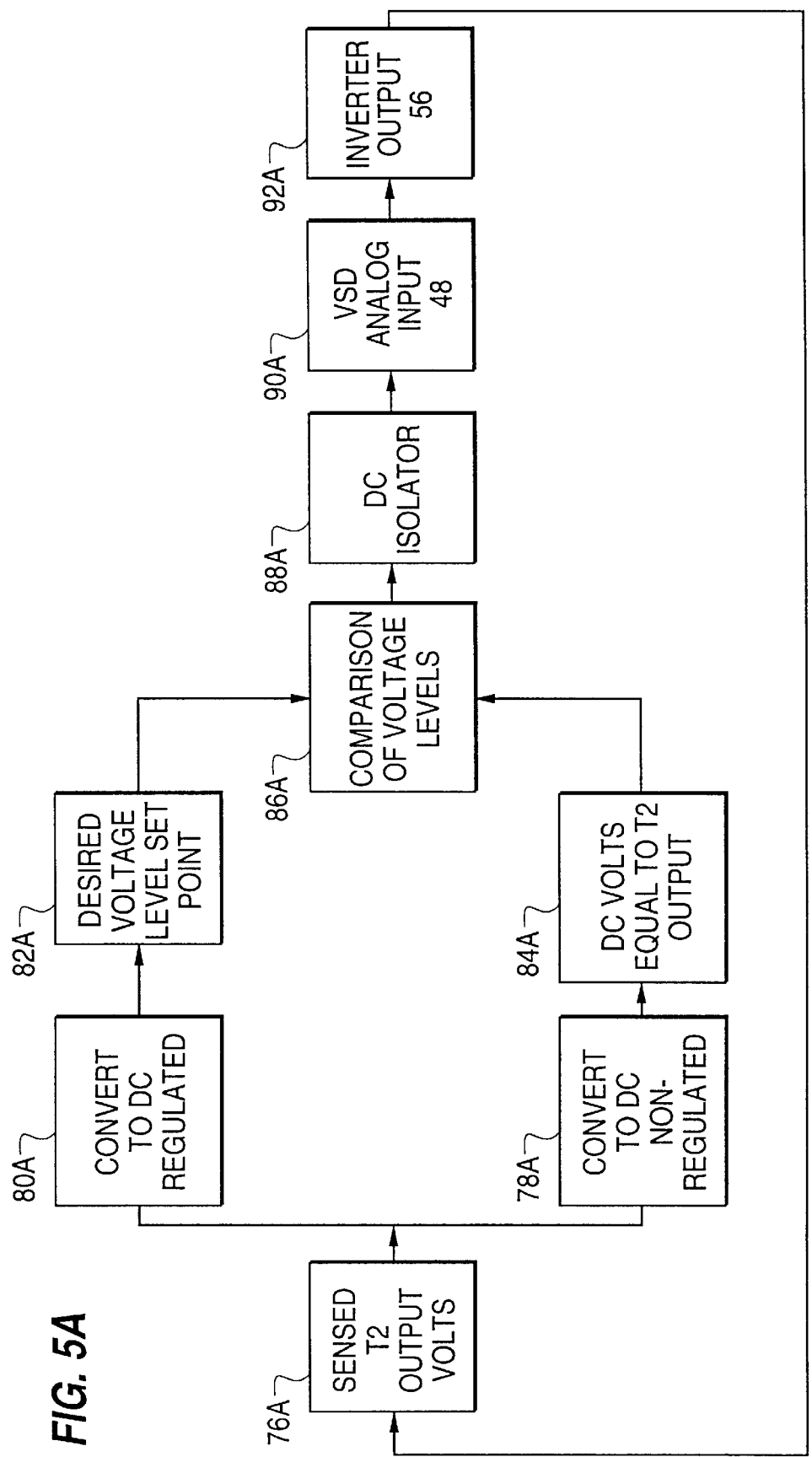
FIG. 5A is a flow chart showing voltage regulation using a voltage regulator shown in FIG. 2A.

Alternatively, in reference to the operation of the voltage regulator 66a (FIG. 2A), FIG. 5A shows that the power converter 10 includes provisions for regulating the output voltage of the output transformer T2. Starting at block 76a, the regulator 66a receives the AC output voltage from the transformer T2. At block 78a, the output voltage is converted to a non-regulated DC voltage. At block 80a, the output is converted to a regulated DC voltage. The desired voltage level setpoint is at block 82a, whereas the DC level proportional to the output of the transformer T2 is at block 84a. A comparison of voltage levels is conducted in block 86a and the resulting voltage level is isolated from any feedback in block 88a, after which the desired voltage level signal is sent in block 90a to the analog input 48 of the variable speed drive 40. In response, the base driver 54 is cause to alter the signal to the transistor inverter 56 (block 92a) as appropriate to establish the desired output voltage of the output transformer T2.

Frequency Control

Under normal operation, the PC board 44 in response to a programmed frequency value brings the output of the variable speed drive 40 to the programmed frequency level. For example, the ship's electrical components may require a 60 Hz frequency and yet the shore power may be a 50 Hz power supply in some ports. In this case, the frequency parameter at the PC board 44 is set to a value corresponding to 60 Hz which suits the shipboard requirements. The shore power AC input to the variable speed drive 40 is rectified through the full bridge rectifier 38 to supply DC power to the power transistors (not shown) in the 3-phase power transistor/inverter module 56. The power transistors reproduce a new three-phase output at the programmed frequency (60 Hz in the example). In this regard, signals that indicate the frequency are passed through the control sequence (44, 46, 48, 50, 52) to the base driver unit 54. The base driver unit 54 passes the current to the base input of all the power transistors in the transistor/inverter module 56 at a predetermined pulse rate. The power transistors then generate a three-phase voltage sinewave to match the programmed voltage level at the programmed output frequency as required by the load.

Phase Control

If desired, the phase selector 22 shown in FIG. 2 may be incorporated into the power converter 10. The details of the phase selector 22 are shown in FIGS. 6 and 7, and as shown in FIG. 6, the phase selector 22 includes an "A" input 92 having input terminals A1 and A2 for receiving AC power having one or two phases. Also, a "B" input 94 having input terminals B1 and B2 is provided for receiving AC power having one or two phases. Both the A1 and B1 terminals can be electrically connected to the first input line L1 of the input transformer T1, as more fully disclosed below, whereas the A2 and B2 terminals can be electrically connected to the third input line L3 of the input transformer T1. Moreover, a three phase input 96 having input terminals A, B, and C is included for receiving AC power having three phases, and the three phase input terminals A, B, and C can be respectively connected to the first, second, and third input lines L1, L2, L3 of the input transformer T1.

Figure 6:
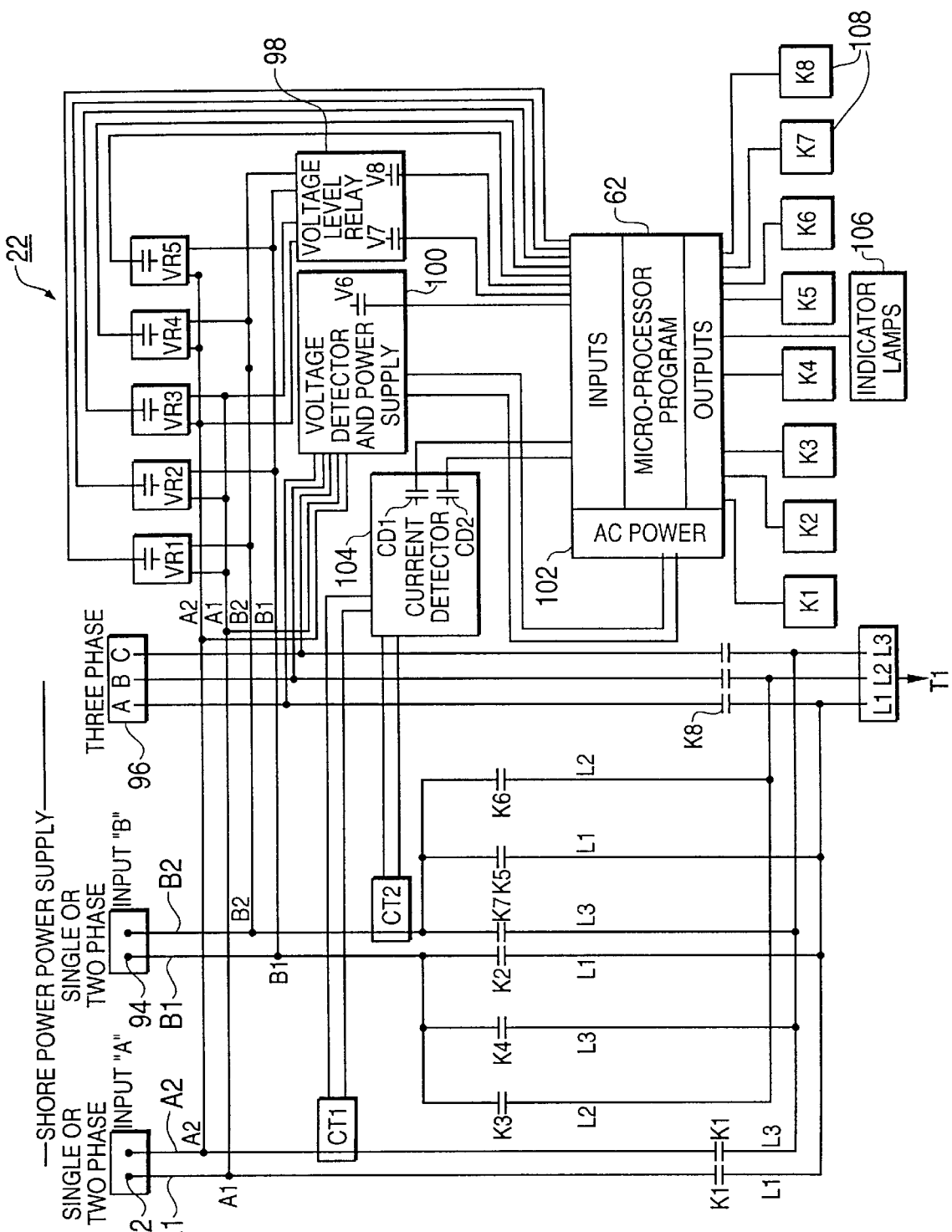
FIG. 6 is an electrical schematic of the phase selector of the present invention.

As further shown in FIG. 6, first through fifth sensing relays VR1–VR5 sense respective voltage differences between input terminals of the "A" and "B" inputs 92, 94, and the sensing relays VR1–VR5 operate associated sensing contacts in response to sensed voltage differences. More specifically, the first sensing relay VR1 senses a voltage difference between terminals A1 and B2, and the second sensing relay VR2 senses a voltage difference between terminals A1 and B1. Also, the third sensing relay VR3 senses a voltage difference between terminals A1 and A2, the fourth sensing relay VR4 senses a voltage difference between terminals A2 and B2, and the fifth relay VR5 senses a voltage difference between terminals A2 and B1.

When one of the sensing relays VR1–VR5 senses a voltage difference between two input terminals, it closes its associated contact, thereby causing a signal to be sent to the input of the microprocessor 62. It is to be understood that while FIG. 6 shows that the microprocessor 62 shown in FIG. 2 is used to control the phase selector 22, in an alternative configuration the phase selector 22 can be controlled by a suitable microprocessor (not shown) other than the microprocessor 62.

Continuing with the description of FIG. 6, a voltage level relay (VLR) 98 senses whether voltages are present at the input terminals of the "A" and "B" inputs 92, 94. When a voltage is present at one of the "A" input terminals, the VLR 98 closes a contact V7 to send a signal to the microprocessor 62. On the other hand, when a voltage is present at one of the "B" input terminals, the VLR 98 closes a contact V8, thereby causing a signal to be sent to the input of the microprocessor 62.

When three phase shore power is connected to the three phase input 96, a voltage detector and power supply (VDPS) 100 senses this fact and closes a contact V6, thereby causing a signal to be sent to the input of the microprocessor 62. Also, the VDPS 100 receives an input signal from the A input 92. In turn, the VDPS 100 sends operating power to an AC power input module 102 of the microprocessor 62.

Still referring to FIG. 6, a current detector 104 with associated current transformers CT1, CT2 senses whether current flow is present in either the A or B inputs 92, 94. If current flow is present in the A input 92, the current detector 104 closes a contact CD1 to send a signal to the microprocessor 62. If, in contrast, current flow is present in the B input 94, the current detector 104 closes a contact CD2 to send a signal to the microprocessor 62. In response, the microprocessor 62 energizes one or more indicating lamps 106 representative of the particular input(s) to which shore power is connected.

As shown in FIG. 6, the microprocessor 62 selectively energizes a plurality of phasing relays 108, designated in FIG. 6 as K1–K8. These phasing relays 108, when energized, close the like-labelled phasing contacts shown in FIG. 6 that are disposed between the inputs 92, 94, 96 and the input lines L1–L3 of the input transformer T1. It is to be understood that the contacts and relays shown in FIG. 6, although labelled similarly to components shown in previous drawings, bear no other relationship to the previously shown components, other than being within the power converter 10.

Figure 7:
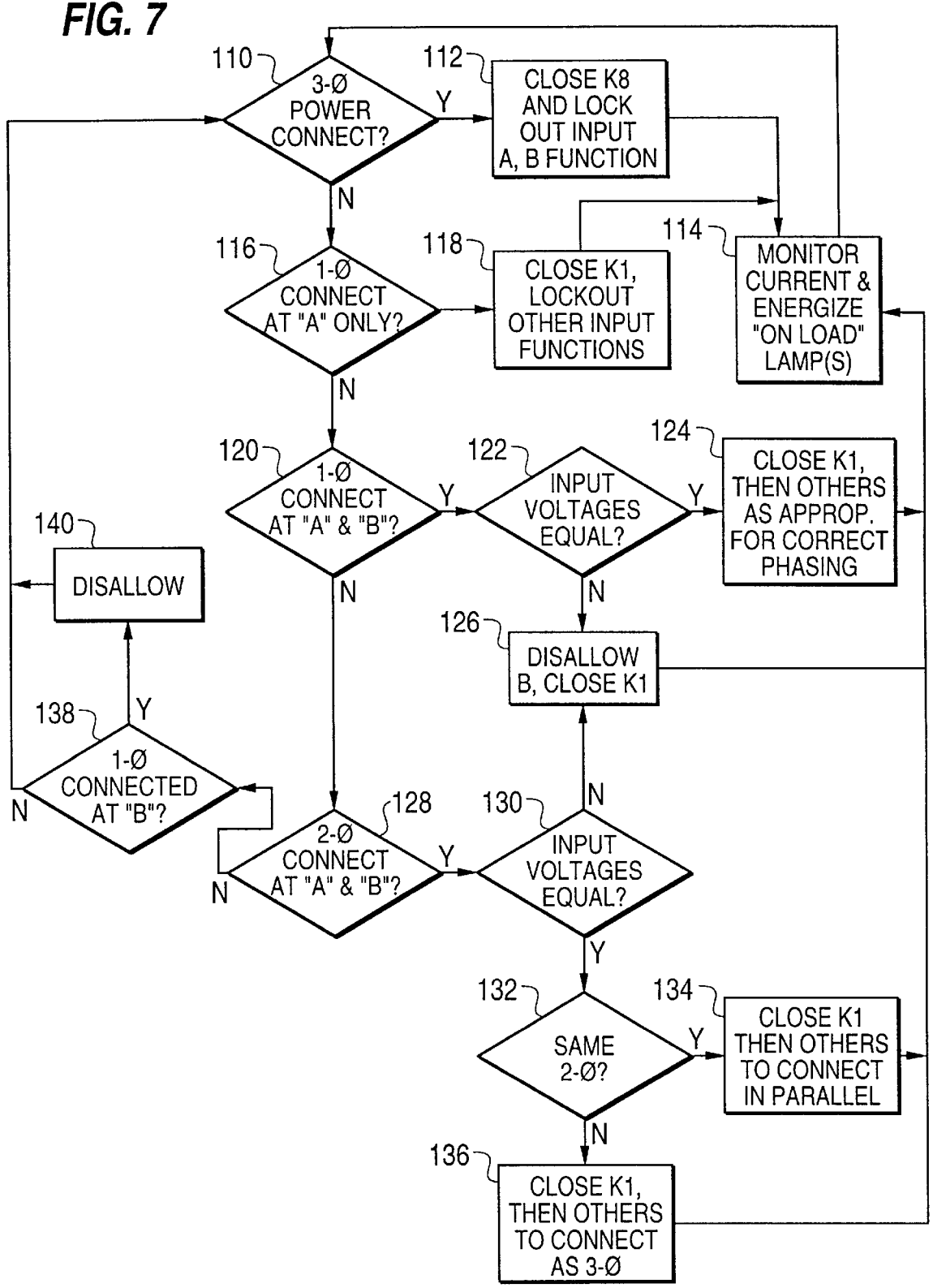
FIG. 7 is a flow chart showing the logic of the phase selector.

FIG. 7 shows the operation of the phase selector 22. It is to be understood that a two pole manual selector switch (not shown) can be electrically connected to the microprocessor 62, if desired, to enable the process described below which is undertaken by the microprocessor 62.

Starting at decision block 110, the microprocessor 62 determines whether three phase shore power has been connected to the three phase input 96, as indicated by closing of contact V6 by the VDPS 100. If so, the microprocessor 62 moves to block 112 to close phasing contacts K8 to connect the three phase shore power to the input lines L1, L2, L3 of the input transformer T1 shown in FIG. 2. Also, the microprocessor 62 locks out shore power that is subsequently connected to the A or B inputs 92, 94. By "lock out" is meant that the phasing relays that must be energized to connect the "locked out" inputs to the input lines L1–L3 are maintained deenergized.

From block 112, the microprocessor 62 moves to block 114 to monitor for current that may pass through the A or B inputs 92, 94, as indicated by signals from the current detector 104. Also at block 114, the microprocessor 62 energizes an "on load" lamp (represented by block 106 in FIG. 6) to indicate that shore power is connected to the three phase input 96. Then, the microprocessor 62 returns to decision block 110 to initiate another cycle.

If the test at decision block 110 was negative, the microprocessor 62 moves to decision block 116, wherein the microprocessor 62 determines whether single phase line-to-neutral or phase-to-phase shore power is connected at the A input 92 only as indicated by the closing of contact V7 by the VLR 98. Additionally, if single phase shore power is connected to the A input 92, sensing relay VR3 closes its associated contact and sends a signal to the microprocessor 62. if single phase shore power is connected to the A input 92, the microprocessor 62 moves to block 118 and closes phasing contacts K1, also locking out the B and three phase inputs 94, 96. From block 118, the microprocessor 62 moves to block 114.

If the test at decision block 116 was negative, the microprocessor 62 moves to decision block 120, wherein the microprocessor 62 determines whether single phase line-to-neutral or phase-to-phase shore power is connected to both the A input 92 and B input 94 as indicated by the closing of contacts V7 and V8 by the VLR 98. If so, the microprocessor 62 moves to decision block 122, wherein the microprocessor 62 determines whether the voltages at the A and B inputs 92, 94 are equal to each other.

To determine whether the voltages are equal, the microprocessor 62 receives the voltage signals from the sensing relays VR1–VR5. If the voltages are equal, the microprocessor 62 proceeds to block 124, to close the phasing contacts K1 first. Then, the phasing contacts K2–K7 are closed as appropriate for correct phasing, i.e., to ensure that inputs of like phases are connected to a common input line L1, L2, or L3.

For example, if the sensing relays VR1–VR5 indicate that input terminals A1 and B1 are both connected to "line", and terminals A2 and B2 are both connected to "neutral", contacts K2 and K7 would be closed at block 124 after contact K1. Consequently, the power sources at the A and B inputs 92, 94 would be correctly connected in parallel to input lines L1 and L3 of the input transformer T1. On the other hand, if terminals A1 and B2 are connected to "line" and terminals A2 and B1 connected to "neutral", the microprocessor 62 would sense this fact based upon the signals from the sensing relays VR1–VR5 and consequently close, after the K1 contacts, the K4 and K5 contacts. Thus, in accordance with the present invention the phase sensor 22 establishes correct phasing when connecting a plurality of AC inputs in parallel to a power distribution system, e.g., the input lines L1–L3.

If the A and B voltages were determined to be unequal at decision block 122, the microprocessor 62 moves to block 126, to close the K1 contacts and lock out B functions. From blocks 124 and 126, the microprocessor 62 proceeds to block 114.

If the test at decision block 120 was negative, the microprocessor 62 moves to decision block 128 to determine whether two phase shore power is connected to both the A and B inputs 92, 94. If it is, the microprocessor 62 proceeds to decision block 130, wherein the microprocessor 62 determines whether the voltages at the inputs 92, 94 are equal to each other. If not, the microprocessor 62 moves to block 126.

Otherwise, the microprocessor 62 proceeds to decision block 132 to determine whether the phases present at the A input 92 are the same two phases that are present at the B input 94. If they are, the microprocessor 62 moves to block 134 to first close contacts K1, and then two of the contacts K2–K7 as appropriate to establish correct phasing as discussed above, and thence to block 114.

In contrast, if the phases present at the A input 92 are not the same two phases that are present at the B input 94, the microprocessor 62 moves to block 136 to close contact K1, then two of the contacts K2–K7 as appropriate to establish a three phase input signal to the input transformer T1. Stated differently, at block 136 the microprocessor 62 energizes all three input lines L1–L3, each with its respective AC phase. For example, if phase A is connected to terminals A1 and B1, phase B is connected to terminal A2, and phase C is connected to terminal B2, contacts K2 and K6 would be closed after contact K1 to thereby establish a three phase input to the transformer T1.

In particular, as can be seen in FIG. 6 contacts K1 is closed to connect the first input line L1 with phase A from terminal A1 and to connect the third input line L3 with phase B from terminal A2. After contacts K1 are closed, contact K2 is closed to connect phase A from terminal B1 to the first input line L1, and contact K6 is closed to connect phase C from terminal B2 to the second input line L2, thereby establishing a three-phase input to the input transformer T1. From block 134, the microprocessor 62 proceeds to block 114.

When the test at decision block 128 is negative, the microprocessor 62 proceeds to decision block 138 to determine whether single phase shore power is connected to the B input 94. If it is, the process moves to block 140 to lock out the B input. From block 140, or from block 138 if the test there was negative, the microprocessor 62 loops back to decision block 110.

Generator No-Break Transfer System

A generator no-break transfer system ("transfer system") including the power converter 10 of the invention is illustrated in FIG. 8. The transfer system includes a transfer module 200 through which the AC shore power supply may be connected when the ship is at dockside. The transfer system is intended to provide a means and method for seamless transfer of power among a plurality of sources including an AC shore power supply and two or more on-board sources including, for example, a first generator (GEN 1) 202, a second generator (GEN 2) 203, and a third generator (GEN 3) 204. The transfer system is provided to accommodate those ships having a plurality of on-board AC power sources between which connection to the ship's load might be switched while the ship is underway, moored, or tied at dockside.

The system illustrated in FIG. 8 includes the power converter 10 configured as shown in FIG. 2, with the exception that the input transformer T1 and the contactor K9 are connected to outputs of the transfer module 200. Hereinafter, the input side of the contactor K9 is referred to as the "bypass side" of the power converter 10, while the input windings 34 of the transformer T1 are referred to as the "input side" of the power converter 10.

Conventionally, when a ship's load is removed from one shipboard generator and then applied to another shipboard generator, the load is transferred by being disconnected from the one generator, following which the load is applied to the other generator. This mode of load transfer interrupts power to the load and can be a nuisance or even a threat to electronic devices and other types of equipment connected to the ship's load. The transfer system illustrated in FIG. 8, in conjunction with the power converter of FIG. 2, provides seamless AC power transfer, transferring the load from one generator to another, or from one generator to the AC shore power supply, or from the AC shore power supply to any one of the individual generators, without interruption to the load. The transfer is done by the transfer module 200.

The transfer module 200 includes an enclosure (the dotted line indicated by the reference numeral 200), a plurality of contactors K10 through K16, four voltage relays V1–V4, a voltage power supply 210 and microprocessor 212 with input connections and conversion circuitry 213, output connections and conversion circuitry 214, power circuitry 215, and a transfer program 216. In addition, the transfer module 200 includes four current transformers (CT1–CT4), a current relay (CD3), three push buttons (PB1–PB3), and an indicator/alarm panel 220.

The operation of the transfer module 200 will now be described. Presuming AC input power from the AC shore power source is to be disconnected and generator 202 is to power the load, the voltage relay V2 will sense the output voltage from the generator 202. When this occurs, a contact in the voltage relay V2 will close, providing a signal to the input 213 of the microprocessor 212. When the microprocessor 212 senses closure of the contact in the voltage relay V2, it provides an output signal energizing the contactor K14, closing its contacts and allowing the output of the generator 202 to pass to the bypass side of the power converter 10. The power converter 10 operates as described above to synchronize the closure of contactor K9 and the opening of contactor K4, thereby disconnecting the AC shore power source and connecting the generator 202 to the ship's load.

Assume now that the generator 202 is to be stopped for maintenance and that the generator 203 is to power the ship's load. First, the generator 202 is transferred to the input side of the power converter. To prepare for this transfer, the generator pushbutton PB1 is depressed. In response, the microprocessor 212 provides an output signal to close the contactor K11, thereby shunting the output of the generator 202 to the input windings of the input transformer T1. The power converter 10 automatically carries out the sequences described above, and, as the synchronizer 60 detects the power signals at contactors K4 and K9 to be in phase, the microprocessor 62 closes the contactor K4, thereby allowing power from the generator 202 to flow, in parallel, through the input and bypass sides of the power converter. After the predetermined amount of time, the contacts of K9 open, thereby passing the output of the generator 202 to the bus 17 via T1, 40, T2, K4. The current relay CT2, positioned between the contactor K11 and the generator 202, senses the current passing to the load through the input side of the power converter 10 and so signals the microprocessor 212. The microprocessor 212 then de-energizes the contactor K14, opening its contacts and disconnecting the power from the generator 202 from the bypass side of the power converter 10. Now, the generator 203 is started, closing the contact of the voltage relay V3 and thereby signaling the microprocessor 212 of the availability of the generator 203. In response, the microprocessor 212 closes the contacts of the contactor K15, thereby allowing the output power from the generator 203 to pass into the bypass side of the power converter 10. The synchronizer 60 then monitors the two power sources and the synchronized switchover from the generator 202 to the generator 203 through the contactor K9 is accomplished as described above. When the contacts of the contactor K9 close and the contacts of the contactor K4 open, a current flows through the current transformer CT1, closing the current relay CD3, thereby providing an input to the microprocessor 212 indicating that the power converter 10 has transferred the load from the generator 202 to the generator 203. In response, the microprocessor 212 provides an output signal to the contactor K11, de-energizing it and opening its contacts, resulting in the disconnection of the generator 202 from the input side of the power converter 10. At this point, the generator 202 can be closed down for maintenance.

If the transfer system of FIG. 8 is incorporated into a shipboard power configuration, initial powerup by way of either an input AC shore power signal or an output from any one of the generators 202, 203, or 204 activates the power supply 210, powering up the microprocessor 212, and closing the related one of the voltage relays V1–V4. Thus, at initial powerup, the microprocessor 212 is powered on by the power supply 210 and receives an input signal indicating the source of AC power.

Upon connection of an input AC shore power source to the transfer system, the voltage relay V1 senses the AC power, its contact closes, and an input signal is provided to the microprocessor 212 indicating that AC power is input from a shore power source. At this point, the microprocessor 212 checks all inputs and functions and, there being no shipboard AC power supplies connected at this time, the contactor K10 is energized by an output signal from the microprocessor 212. The contacts of the contactor K10 close, allowing the shore power to pass to the input side of the power converter 10. The power converter 10 operates as described above, conditioning the voltage, frequency, and phase of the input power to the characteristics required for the ship's load.

If initial power up is by way of one of the generators 202, 203, 204, the sequence described above is followed, with one of the voltage relays V2–V4 indicating which of the generators is powered up. The sole exception is that when power is to be provided by way of the generator, the appropriate one of the contactors K14, K15, K16 is energized connecting the generator to the bypass side of the power converter and powering the bus 17 through the contactor K9.

After initial power up, the transfer system of FIG. 8 operates as described above if the load is to be transferred from the AC shore power source or any one of the generators 202, 203, 204 to any other of those sources, with the transfer being synchronous between any two generators or any one generator and the shore power source with the exceptions of the contactor sequencing.

While a particular power converter for converting AC shore power to shipboard use as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. An AC power converter, comprising:
   a converter input for receiving a first input AC power signal;
   a variable inductance input transformer with selectively configurable primary windings connected to the converter input, and output windings;
   a variable speed drive having an input connected to the output windings of the input transformer and an output;
   an output transformer connected to the output of the variable speed drive;
   an AC power output terminal connected to the output transformer for providing a first AC output power signal;
   an input AC power sensor connected to the first input AC power signal; and
   a control unit connected to the input AC power sensor and to the primary windings of the input transformer to selectively configure the primary windings of the input transformer in response to an AC power signal on the converter input;
   said AC power converter further including a harmonic filter connected to the AC power output terminal, wherein the output transformer includes input windings connected to the output of the variable speed drive and output windings connected to the AC power output terminal;
   wherein the input transformer is a variable tap transformer with a plurality of taps in the primary windings and the control unit includes:
      a plurality of switches, each switch connected to provide a closed circuit or an open circuit between two respective taps of said plurality of taps; and
      processor means for causing the plurality of switches to configure the primary windings in a delta or a wye circuit.

2. The power converter of claim 1, wherein the processor means is for causing the plurality of switches to configure the primary windings in:
   a high voltage delta configuration;
   a low voltage delta configuration;
   a high voltage wye configuration; and
   a low voltage wye configuration.

3. The power converter of claim 1, wherein the processor means is for causing the plurality of switches to configure the primary windings in:
   a high voltage series delta configuration;
   a low voltage series delta configuration;
   a high voltage parallel delta configuration; and
   a low voltage parallel delta configuration.

4. An AC power converter, comprising:
   a converter input for receiving a first input AC power signal;
   a variable inductance input transformer with selectively configurable primary windings connected to the converter input, and output windings;
   a variable speed drive having an input connected to the output windings of the input transformer and an output;
   an output transformer connected to the output of the variable speed drive;
   an AC power output terminal connected to the output transformer for providing a first AC output power signal;
   an input AC power sensor connected to the first input AC power signal; and
   a control unit connected to the input AC power sensor and to the primary windings of the input transformer to selectively configure the primary windings of the input transformer in response to an AC power signal on the converter input;
   said AC power converter further comprising
      a phase selector electrically connected between the first input AC power signal and the converter input, the phase selector having an "A" input for receiving AC power having one or two phases, a "B" input for receiving AC power having one or two phases, and a three-phase input for receiving AC power having three phases; and
      means for causing the phase selector to connect only the three-phase input to the converter input when three-phase AC power is present at the three-phase input before AC power is present at the "A" and "B" inputs.

5. The power converter of claim 4, further comprising means for causing the phase selector to connect the "A" input to the converter input when one or two phase AC power is present at both inputs and the voltage AC power at the "A" input does not equal the voltage of the AC power at the "B" input.

6. The power converter of claim 5, further comprising means for causing the phase selector to connect the "A" input to the converter input and for connecting the "B" input to the converter input when two phase AC power is present at both inputs and one phase at the "A" input is different from the two phases at the "B" input.

7. An apparatus for interconnecting a source of AC shore power characterized by a shore voltage to an AC distribution bus on a ship requiring an operating voltage, comprising:
   an input transformer including primary windings having a plurality of taps, the input transformer being connectable to the source of AC shore power, the input transformer also being connectable in electrical communication with the AC distribution bus;
   a plurality of switches, each connected to provide a closed circuit or an open circuit between two respective taps of plurality of taps; and
   a control unit for configuring the plurality of switches to establish a configuration of the primary windings in response to at least the shore voltage.

8. The apparatus of claim 7, wherein the input transformer is a variable inductance input transformer with selectively configurable primary windings, the input transformer also having output windings, the apparatus further comprising:
   a variable speed motor drive having an input connected to the output windings of the input transformer and an output;
   an output transformer connected to the output of the variable speed motor drive; and an AC power output terminal connected to the output transformer for providing a first AC output power signal to the AC distribution bus.

9. The apparatus of claim 8, further including:

an AC output power sensor connected to the AC power output terminal;

control means in the control unit, coupled to the AC output power sensor and to the variable speed motor drive for regulating the voltage of the first AC output power signal.

10. The apparatus of claim 9, further including:

a switch selectively movable between a first position, wherein the first AC output power signal is connected to an AC load, a second position, wherein a second AC output power signal is connected to the AC load, and a third position, wherein both AC output power signals are connected to the AC load;

an AC phase synchronizer connected to the AC output power signals and to the control unit for generating a difference signal representative of the phase difference between the AC power output signals; and means in the control unit for establishing the position of the switch in response to the difference signal, the establishing means moving the switch to the third position only when substantially no phase difference exists between the AC power output signals.

11. The apparatus of claim 10, wherein the means in the controller is for moving the switch from the third position to the second or first position upon passage of a predetermined delay from setting the switch to the first state.

12. The apparatus of claim 11, further including a harmonic filter connected to the AC power output terminal, wherein the output transformer includes input windings connected to the output of the variable speed drive and output windings connected to the AC power output terminal.

13. The apparatus of claim 12, wherein the control unit includes:

processor means for causing the plurality of switches to configure the primary windings in:
a high voltage delta configuration;
a low voltage delta configuration;
a high voltage wye configuration; and
a low voltage wye configuration.

14. The apparatus of claim 12, wherein the control unit includes:

processor means for causing the plurality of switches to configure the primary windings in:
a high voltage series delta configuration;
a low voltage series delta configuration;
a high voltage parallel delta configuration; and
a low voltage parallel delta configuration.

15. The apparatus of claim 12, further comprising:

a phase selector electrically connected between the first AC input power signal and the input transformer, the phase selector having an "A" input for receiving AC power having one or two phases, a "B" input for receiving AC power having one or two phases, and a three phase input for receiving AC power having three phases.

16. The apparatus of claim 15, further comprising:

means for causing the phase selector to connect only the three-phase input to the input transformer when three phase AC power is present at the three phase input before AC power is present at the "A" and "B" inputs;

means for causing the phase selector to connect the "A" input to the input transformer when one or two phase AC power is present at both inputs and the voltage AC power at the "A" input does not equal the voltage of the AC power at the "B" input; and means for causing the phase selector to connect the "A" input to the input transformer and for connecting the "B" input to the input transformer when two phase AC power is present at both inputs and one phase at the "A" input is different from the two phases at the "B" input.

17. A method for connecting a source of AC power characterized by a supply voltage to an electrical component requiring AC power characterized by an operating voltage different from the supply voltage, comprising:

providing a variable inductance input transformer with primary windings selectively configurable by means of a plurality of switches associated with the primary windings, the input transformer also having output windings;

connecting the primary windings of the input transformer to the source of AC shore power;

operating at least some of the switches to selectively establish a delta or wye configuration of the primary windings in response to at least the supply voltage; and establishing electrical communication between the output windings of the input transformer and the electrical component.

* * * * *